United States Patent
Quach et al.

(10) Patent No.: US 7,054,974 B2
(45) Date of Patent: *May 30, 2006

(54) SYSTEM FOR END OF INTERRUPT HANDLING

(75) Inventors: Tuan M. Quach, Portland, OR (US); Subbarao S. Vanka, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/839,857

(22) Filed: May 5, 2004

(65) Prior Publication Data

US 2004/0210697 A1    Oct. 21, 2004

Related U.S. Application Data

(63) Continuation of application No. 09/475,485, filed on Dec. 30, 1999, now Pat. No. 6,754,754.

(51) Int. Cl.
*G06F 9/48* (2006.01)
*G06F 13/24* (2006.01)

(52) U.S. Cl. .................. 710/260; 710/48; 710/269
(58) Field of Classification Search ........ 710/260–269, 710/48, 52, 305, 313; 709/253

See application file for complete search history.

(56) References Cited

U.S. PATENT DOCUMENTS

| | | | |
|---|---|---|---|
| 5,506,997 A * | 4/1996 | Maguire et al. ............ 710/260 |
| 5,555,420 A * | 9/1996 | Sarangdhar et al. ........ 710/266 |
| 5,727,217 A | 3/1998 | Young |
| 5,771,387 A * | 6/1998 | Young et al. ............... 710/260 |
| 5,918,057 A | 6/1999 | Chou et al. |
| 6,192,442 B1 | 2/2001 | Haren et al. |
| 6,298,410 B1 * | 10/2001 | Jayakumar et al. ......... 710/266 |
| 6,754,754 B1 * | 6/2004 | Quach et al. ............... 710/260 |
| 2001/0052043 A1 * | 12/2001 | Pawlowski et al. ......... 710/260 |
| 2002/0087775 A1 * | 7/2002 | Looi et al. .................. 710/260 |

OTHER PUBLICATIONS

"a client-based scheduling algorithm for Web proxy clusters" by Narlikar et al. (abstract only) Publication Date: Apr. 4-6, 2001.*

Intel 82093AA I/O Advanced Programmable Interrupt Controller (IOAPIC) Specification, 20 pages.

Espasa, M., Valero, M., and Smith, J.E., "*Out-of order vector architectures*", Abstract only, Dec. 1997, 2 pages.

* cited by examiner

*Primary Examiner*—Gopal C. Ray
(74) *Attorney, Agent, or Firm*—Blakely, Sokoloff, Taylor & Zafman LLP

(57) ABSTRACT

An interrupt controller includes circuitry to process at least one end of interrupt (EOI) vector, the circuitry being capable of substantially simultaneously comparing the at least one EOI vector with a plurality of interrupts.

10 Claims, 5 Drawing Sheets

200

400

SYSTEM FOR END OF INTERRUPT HANDLING

The present patent application is a continuation of Ser. No. 09/475,485 filed Dec. 30, 1999 now U.S. Pat. No. 6,754,754, which is currently pending.

BACKGROUND

1. Field

This disclosure relates to interrupt control and, more particularly, to handling indications of end of interrupts.

2. Background Information

The use of interrupts in computing and electronic systems is common for servicing components of the system. Typically, an interrupt controller receives interrupt requests and generates interrupt vectors in response to these requests. An interrupt service routine (ISR) may be executed in response to such an interrupt request. Typically, an end of interrupt (EOI) vector may then indicate completion of an ISR. Processing EOI vectors has historically not been substantially limiting to system performance. However, improvements in computing efficiency, such as bus frequency increases and microprocessor advancements, increase the likelihood that EOI vector processing times might impact system performance. Therefore, a need exists to reduce the overall time for processing EOI vectors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
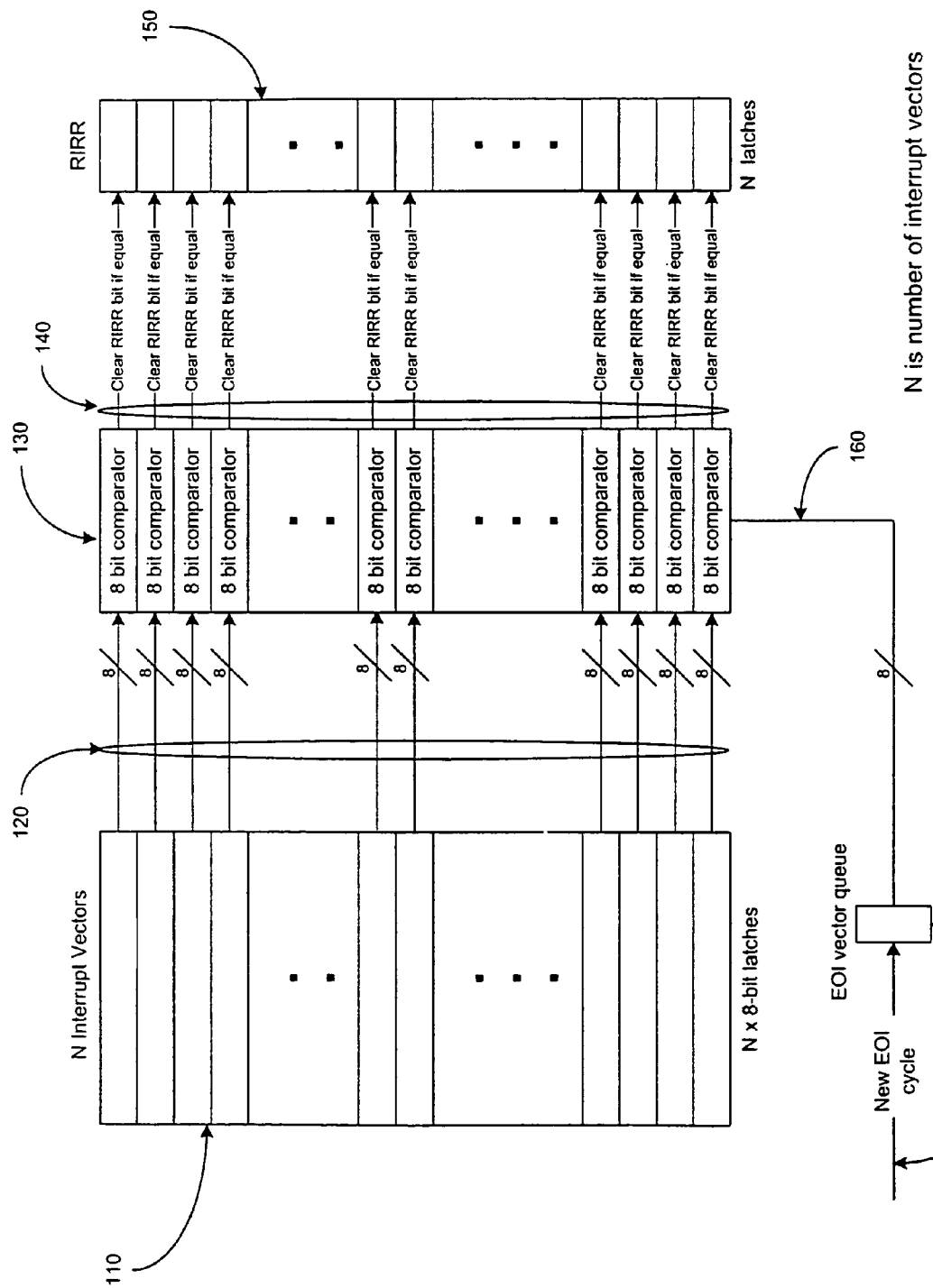
FIG. 1 is a block diagram illustrating an embodiment of a circuit for end of interrupt handling in accordance with the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Interrupt controllers are commonly used in both general and special purpose computing systems, hereinafter "system(s)." When it is desirable to temporarily interrupt a current execution flow of an instruction-processing portion of a system to execute some particular function or set of functions, an interrupt request may be generated by a system component, such as a printer, for example. In certain embodiments interrupt requests are assigned respective priorities based on the desired performance attributes of the particular embodiment in which they are employed. An interrupt request is typically generated by a signal from a system component to an interrupt controller or, alternatively, for example, from circuitry embodied in an interrupt controller. After an interrupt request is generated, the interrupt controller may then transmit an electronic message, commonly termed an interrupt vector, to the instruction-processing portion of a system. An interrupt vector may be transmitted, for example, via an interrupt control bus, such as 520 illustrated in FIG. 5. An instruction-processing portion of a system may comprise, for example, a processor, such as 510, or a microprocessor (not shown). Hereinafter, instruction-processing portions of computing systems will be referred to as a "processor" for the sake of simplicity and consistency. However, it is noted that the invention is not limited in scope to the embodiments to be described later or to any particular processor, microprocessor or instruction-processing apparatus.

Also, for the sake of consistency, an interrupt request, as previously indicated, refers to an indication by a system component or an interrupt controller that it is desirable that a current execution flow of a processor be temporarily interrupted to execute a particular function or set of functions. A system component or an interrupt controller may generate such an interrupt request, for example. An interrupt or interrupt information refers to a grouping of a plurality of specific pieces of information or fields, implemented as electronic signals, which may be related to management of interrupt sequences in systems. One example on an interrupt sequence may include, for example, a progression of generating an interrupt request, transmission of an interrupt vector, execution of an interrupt service routine, transmission of an end of interrupt vector and handling of the end of interrupt vector by an interrupt controller. Interrupt sequences may, of course, include additional aspects, eliminate some aspects, or process interrupts in a completely different manner than just described. The invention is not limited to any particular interrupt sequence. An interrupt vector refers to a specific field of interrupt information, which comprises electronic signals that may be used to indicate a particular function or set of functions to be executed. An end of interrupt vector refers to an electronic message comprising electronic signals, which indicates that an interrupt service routine for a specific interrupt has been completed. End of interrupt vectors and interrupt service routines are described in more detail below.

While the invention is not limited to any particular embodiment, in certain embodiments, a particular function or set of functions that a processor executes in response to an interrupt request may be commonly referred to as an interrupt service routine (ISR). In such embodiments, an interrupt vector may indicate to a processor a specific ISR to be executed. In other words, though the invention is not limited in scope in this respect, a processor may locate a particular function or set of functions to execute in servicing an interrupt request by using an interrupt vector. Once an ISR for a specific interrupt vector has completed execution, an electronic message corresponding to the interrupt vector may be sent to an interrupt controller by a processor. This electronic message is commonly referred to as an end of interrupt (EOI) vector. The transmission of an EOI vector may indicate to an interrupt controller that a specific interrupt request has been serviced. In other words, in such embodiments, the EOI vector may indicate that an ISR associated with a specific interrupt vector has been executed. An EOI vector may also be transmitted over an interrupt control bus, such as 520, as was previously discussed with regard to interrupt vectors.

Figure 2:
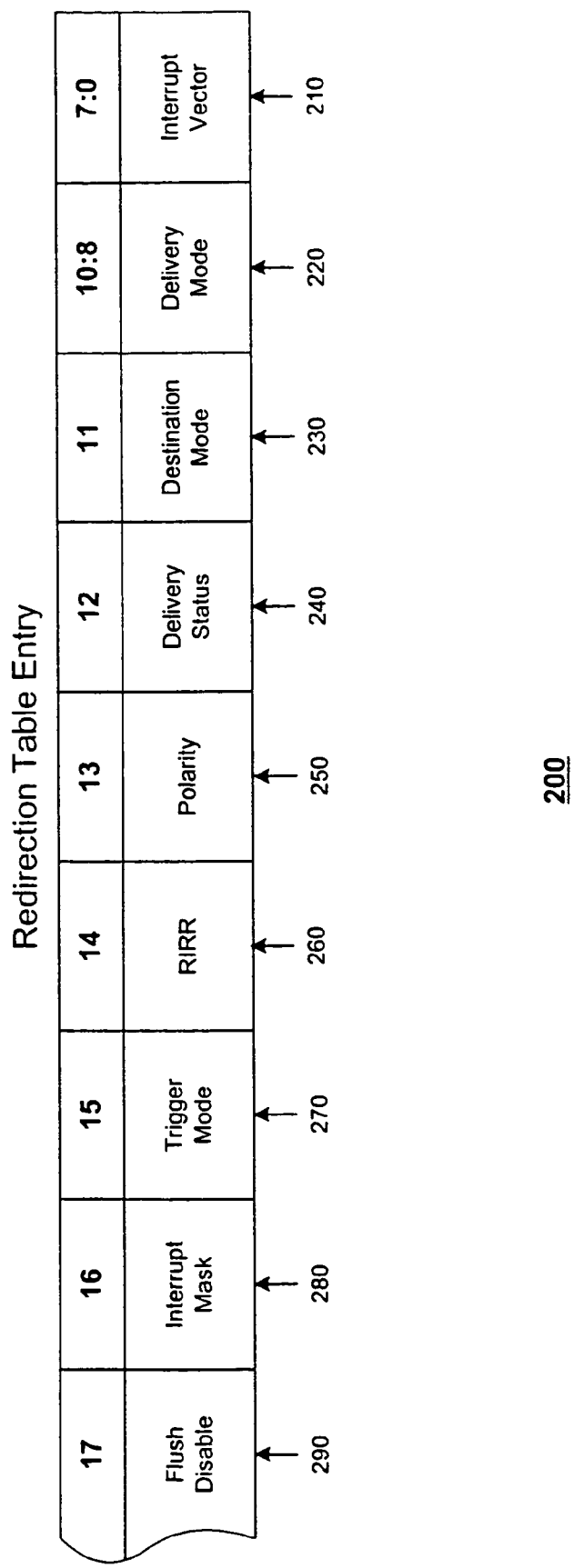
FIG. 2 illustrates an architecture of an embodiment of a redirection table entry, where such redirection table entries may be employed in an embodiment of an end of interrupt handling scheme in accordance with the invention.

In certain embodiments, though the invention is not limited in scope in this respect, interrupts or interrupt information comprising electronic signals may be stored in a table, which may be referred to as a redirection table. Typically, in embodiments employing a redirection table, such a redirection table is implemented as a plurality of redirection table entries, which comprise hardware capable of storing the electronic signals of the interrupts. Referring to FIG. 2, an architecture of an embodiment of a portion of a single redirection table entry 200 is illustrated. Of course, though the invention is not limited in scope to any particular redirection table structure or to the use of a redirection table at all, one field of an interrupt that may be stored in a redirection table entry 200 includes interrupt vector 210. Another field of an interrupt that may be stored in redirection table entry 200 includes remote interrupt request register (RIRR) bit 260.

Figure 3:
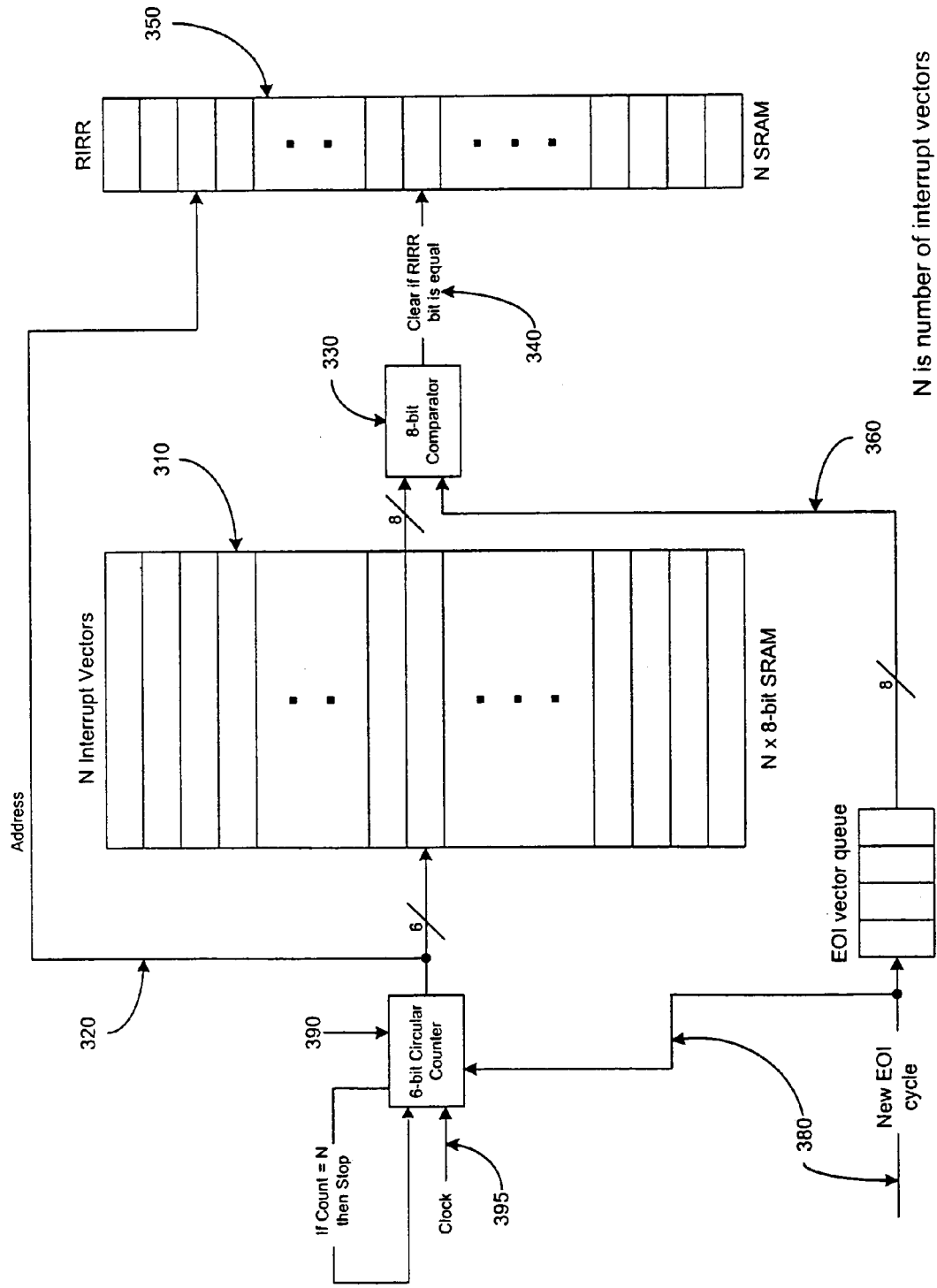
FIG. 3 is a block diagram illustrating a prior art embodiment of a circuit for end of interrupt handling.

Referring to FIG. 3, current interrupt controllers, such as embodiment 300, may process EOI vectors by using a circular counter 390 to sequentially index each possible interrupt stored in a redirection table entry and compare an EOI vector with the interrupt vectors of those interrupts. In this particular embodiment, interrupt vector signals are implemented with N×8-bit static random access memory (SRAM) 310. SRAM typically employs significantly less area for embodiments included on an integrated circuit, making it cost advantageous. However, SRAM architecture, as is well known in the art, results in the interrupt vectors included in N×8-bit SRAM 310 being individually accessed for comparison with EOI vectors. When an EOI vector matches the interrupt vector 210 stored in a specific redirection table entry, such as 200, during a sequential scan, the contents of remote interrupt request register bit 260 corresponding to that interrupt may be cleared. This indicates to an interrupt controller that a processor has serviced that interrupt or, in specific embodiments, executed an associated ISR. Since it may be desirable to execute the same particular function or functions in response to different interrupt requests, multiple interrupts may have the same stored interrupt vector. Therefore, all redirection table entries 200 in a redirection table are scanned for each EOI vector received by an interrupt controller in this particular embodiment. In other words, an EOI vector may match one or more interrupt vectors and, therefore, it is desirable that this result in clearing the RIRR bit(s) associated with that(those) interrupts.

Some disadvantages of current approaches are related to the sequential scanning of possible interrupts to compare their vectors 210 with an EOI vector. This method may typically take at least one clock-cycle for each possible interrupt in a redirection table. For example, in an embodiment with 64 interrupts in which each comparison of an EOI vector to an interrupt vector takes one clock, scanning a redirection table would typically take at least 64 clock cycles per EOI vector compared. Additionally, since current embodiments typically compare only one EOI vector at a time, it is desirable that pending EOI vectors are stored or retained. If EOI vectors are not stored or retained, they may be dropped or may result in the processor re-sending the EOI vector. One common method of retaining or storing EOI vectors is accomplished by employing EOI vector queue 370, such as illustrated in FIG. 3. If pending EOI vectors are not retained, degradation to system performance, as discussed in more detail hereinafter, may occur. Likewise, retaining EOI vectors, such as in EOI vector queue 370, for example, may use additional hardware.

The foregoing disadvantages may also be compounded by increases in efficiency of computing systems, such as processor performance improvements and system bus frequency increases, for example. Improvements in processor performance may reduce the typical time for servicing interrupts, or executing ISRs. Therefore, these processor improvements may increase the frequency with which EOI vectors are transmitted to an interrupt controller. Additionally, increased system bus frequencies may reduce the transfer time for interrupt requests and EOI vectors. Efficiency improvements, such as the foregoing examples, may result in an increase of the number of EOI vectors dropped or the frequency of a processor retrying transmission of EOI vectors. This may be a result from, for example, EOI vector queue 370 becoming full. Either of the above scenarios may potentially result in adverse system performance impacts.

While the invention is not limited in scope to any particular embodiment, FIG. 1 illustrates one embodiment of the invention that addresses at least some of the foregoing disadvantages. In this particular embodiment, an interrupt vector comprises 8 bits, although an interrupt vector may include more or fewer bits. In embodiment 100, a plurality of N interrupt vectors, N being the number of vectors, may be stored in N×8 bit-latches 110. An 8-bit latch of 110 may store an interrupt vector. A cell for one bit of an 8-bit latch may be, for example, implemented using a four-transistor latch, which is well known in the art. The invention is, of course, not limited to using any particular latch configuration or using latches at all.

An embodiment that employs a redirection table including entries such as redirection table entry 200 illustrated in FIG. 2, may include N×8-bit latches 110, which are capable of storing individual interrupt vectors. In this particular embodiment 100, interrupt vector 210 comprises electronic signals that may be one of a plurality of fields related to a particular interrupt. Typically, a redirection table entry, such as 200, comprises hardware capable of storing a plurality of fields comprising electronic signals pertaining to system interrupts, such as 210–290. One such field of a redirection table entry 200 may include a remote interrupt request register (RIRR) bit 260. RIRR bit 260 comprises an electronic signal that may be stored in a latch, such as previously described, for example, though the invention is not limited in this respect. A RIRR bit 260 may be used to indicate whether an EOI vector is pending, that is whether an indication of an ISR being completed is outstanding. In other words, the RIRR bit 260 being set, typically referred to as a digital logic '1', though the invention is not limited in scope in this respect, may indicate an interrupt request has been generated but that the interrupt controller has not yet received an EOI vector for that interrupt request. Also, in this particular embodiment, a redirection table includes a remote interrupt request register, which may comprise N latches 150 that may store RIRR bits for the N interrupts of this particular embodiment.

In this embodiment, N×8 bit latches 110, EOI vector queue 170 and N latches 150 are coupled to a plurality of 8-bit comparators 130. Couplings 120, 140 and 160 are adapted to clear an RIRR bit when the interrupt vector signals in one of the N×8-bit latches 150 are equivalent to the contents of the EOI vector queue 170. In this particular embodiment, these are equivalent when the interrupt vector signals and the EOI vector queue contents have the same bit pattern. Of course there are many alternative embodiments that are possible for determining equivalence of an EOI vector and the invention is not limited in scope to any particular embodiment. For example, encoding and decoding may be used, which may employ an encoded EOI vector. In such an embodiment an encoded EOI vector corresponding to a particular interrupt vector may not have a bit pattern that is identical with a corresponding interrupt vector but may be determined to be equivalent to that interrupt vector, nonetheless. As previously indicated, many additional alternative embodiments are also possible.

In this particular embodiment, when a New EOI cycle 180 occurs, this may indicate that an interrupt controller has received an EOI vector. This EOI vector may be stored in EOI vector queue 170. Couplings, 120, 140 and 160, are further adapted to allow the contents of EOI Vector Queue 170 to be substantially simultaneously compared with the N interrupt vectors stored in N×8-bit latches 110. When the signals of an interrupt vector stored in one of the N×8-bit latches 110 are equivalent to the contents of EOI Vector Queue 170, the 8-bit comparator of 130 associated with that 8-bit latch may transmit a signal on coupling 140. In this embodiment, this signal may in turn be used to clear the RIRR bit associated with that interrupt vector.

Those skilled in the art will appreciate that embodiment 100 addresses at least some of the previously discussed concerns related to current interrupt controllers, such as embodiment 300 illustrated in FIG. 3. As was discussed above, current embodiments typically use circular counters, such as 6-bit circular counter 390, to index interrupt vectors. In this particular embodiment 100, implementing N interrupt vectors in N×8-bit latches 110 allows them to be substantially simultaneously compared to an EOI vector rather that being individually accessed, as with SRAM. This is advantageous as the comparison to the N interrupt vectors may be accomplished, here, in one clock cycle, as opposed to N clock cycles for the N Interrupt vectors of embodiment 300. Again, here, N is the total number of interrupts for a particular embodiment. Also, because an EOI vector stored in EOI vector queue 170 is substantially simultaneously compared with the N interrupt vectors stored in N×8-bit latches 110, the 6-bit circular counter 390 may be eliminated. Additionally, in certain embodiments, EOI vector queue 370 may comprise a cell for a single entry. Therefore, in addition to the reduction in time for processing EOI vectors, an added benefit of reduced gate complexity of an interrupt controller may be realized in some embodiments.

Figure 4:
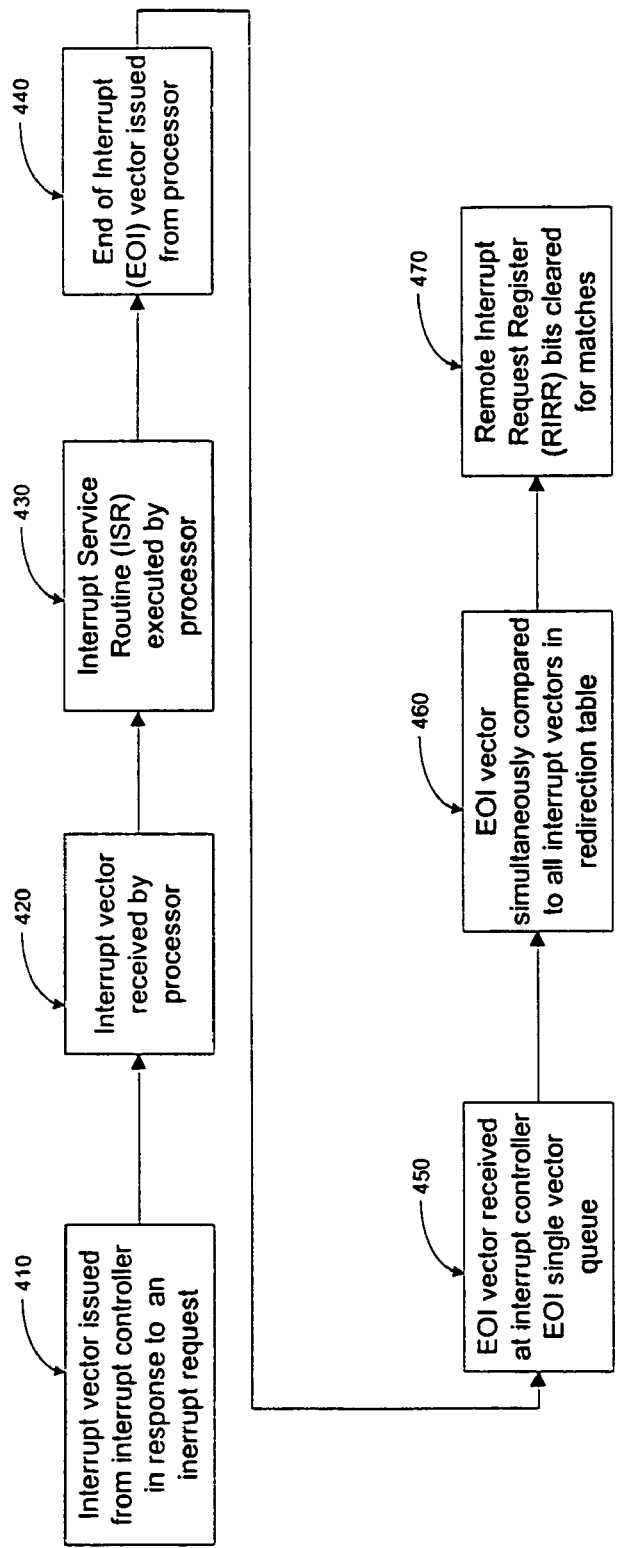
FIG. 4 is a flowchart illustrating an embodiment of a method for end of interrupt handling in accordance with the invention.

FIG. 4 is a flowchart illustrating an embodiment of a method for processing EOI vectors in accordance with the invention. In block 410, an interrupt vector may be issued in response to an interrupt request, such as from a system component. A processor, in block 420, may then receive this interrupt request. For this particular embodiment, the processor may execute an ISR in block 430. Upon completion of this ISR, block 440 may issue an EOI vector, which may be received by an interrupt controller and stored in a single EOI vector queue in block 450. Block 460 may then substantially simultaneously compare this EOI vector with interrupt vectors stored in a redirection table. The RIRR bits may then be cleared in block 470 for interrupt vectors that match the EOI vector.

Figure 5:
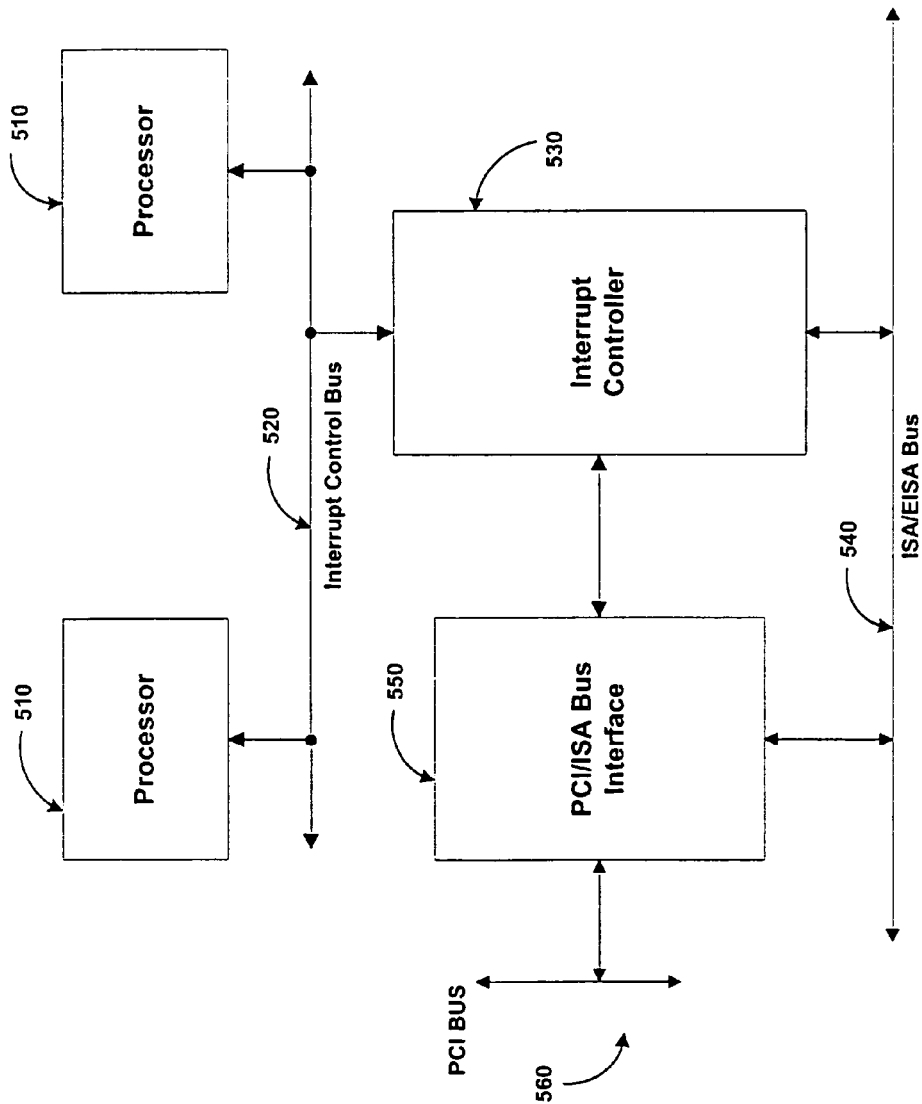
FIG. 5 is a block diagram illustrating an embodiment of a system in accordance with the invention.

An embodiment of a system in accordance with the invention is illustrated in FIG. 5. While the invention is not limited to using any particular bus or bus standard, interrupt controller 530, which may be an interrupt controller such as previously described, may be coupled to a bus interface that complies with the Peripheral Component Interconnect (PCI) and Industry Standard Architecture (ISA) bus standards, such as PCI/ISA Bus Interface 550. In this particular embodiment, the interrupt controller may be further coupled to a bus that is compliant with the ISA and the Extended ISA (EISA) bus standards, such as ISA/EISA bus 540, and an Interrupt Control Bus 520. The PCI local bus specification 2.2, issued Jan. 25, 1999, is well-known and available from the PCI Special Interest Group, 2575 NE Kathryn Street #17, Hillsboro, Oreg. 97124. The ISA and ESIA bus standards are also well-known and are described in detail in ISA & EISA Theory and Operation, by Edward Solari, published November 1992, which is available, for example, from Annabooks Software, 12860 Danielson Court, San Diego, Calif. 92064. An Interrupt Control Bus, such as 520, may be used for transmitting an interrupt vector to a processor, such as 510, or receiving an EOI from such a processor. Interrupt requests may be received from both PCI/ISA Bus Interface 550 and ISA Bus 540, for example. Additionally, in certain embodiments such as this, an interrupt-request may be generated within interrupt controller 530.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A system comprising:
    an interrupt controller capable of transmitting at least one interrupt vector to at least one instruction-processing apparatus and further capable of receiving at least one end of interrupt (EOI) vector from the at least one instruction-processing apparatus;
    an interrupt control bus; and
    a Peripheral Component Interconnect (PCI) compliant bus interface coupling the interrupt controller to the at least one instruction-processing apparatus,
    wherein the interrupt controller is adapted to substantially simultaneously compare the at least one EOI vector with the at least one interrupt vector;
    the at least one interrupt vector being associated with a respective one of a plurality of interrupts,
    wherein the interrupt controller is further adapted to substantially simultaneously compare the at least one EOI vector with a plurality of interrupt vectors including the at least one interrupt vector.

2. The system of claim 1, further comprising:
    circuitry to process at least one end of interrupt (EOI) vector; the circuitry including the capability to substantially simultaneously compare the at least one BOI vector with a plurality of interrupts, at least one of the plurality comprising an interrupt vector.

3. The interrupt controller of claim 2, wherein the plurality of interrupts are stored in a redirection table.

4. The system of claim 1, wherein the at least one instruction-processing apparatus comprises a processor.

5. The system of claim 4, wherein the at least one processor comprises a microprocessor.

6. A system comprising:
    an interrupt controller capable of transmitting at least one interrupt vector to at least one instruction-processing apparatus and further capable of receiving at least one end of interrupt (EOI) vector from the at least one instruction-processing apparatus, the at least one interrupt vector being associated with a respective one of a plurality of interrupts;

an interrupt control bus; and an Industry Standard Architecture (ISA) and Extended ISA (EISA) compliant bus coupling the interrupt controller to the at least one instruction-processing apparatus, wherein the interrupt controller is adapted to substantially simultaneously compare the at least one EOI vector with the at least one interrupt vector, and wherein the interrupt controller is further adapted to substantially simultaneously compare the at least one EOI vector with a plurality of interrupt vectors including the at least one interrupt vector.

7. The system of claim 6, further comprising:

at least one redirection table entry capable of storing a plurality of fields of an interrupt, at least one field comprising an interrupt vector;

wherein the interrupt controller is adapted to substantially simultaneously compare an end of interrupt (EOI) vector with the interrupt vector to be stored in the at least one redirection table entry.

8. The interrupt controller of claim 7, wherein the interrupt controller is further adapted to clear a remote request interrupt register (RIRR) bit if the EOI vector is equivalent to the interrupt vector to be stored in the at least one redirection table entry.

9. The interrupt controller of claim 8, wherein an EOI vector queue is adapted to store the EOI vector so as to compare it with the interrupt vector to be stored in the at least one redirection table entry.

10. The interrupt controller of claim 9, further adapted to substantially simultaneously compare the stored EOI vector with a plurality of interrupt vectors to be stored in a plurality of redirection table entries, each entry capable of storing a plurality of fields of an interrupt;

wherein the plurality of redirection table entries includes the at least one redirection table entry and the plurality of interrupt vectors includes the interrupt vector to be stored in the at least one redirection table entry.

* * * * *